J. H. HAMMOND, Jr.
AUTOMATIC TICKER RECEIVER.
APPLICATION FILED AUG. 24, 1912.
1,098,380.
Patented June 2, 1914.
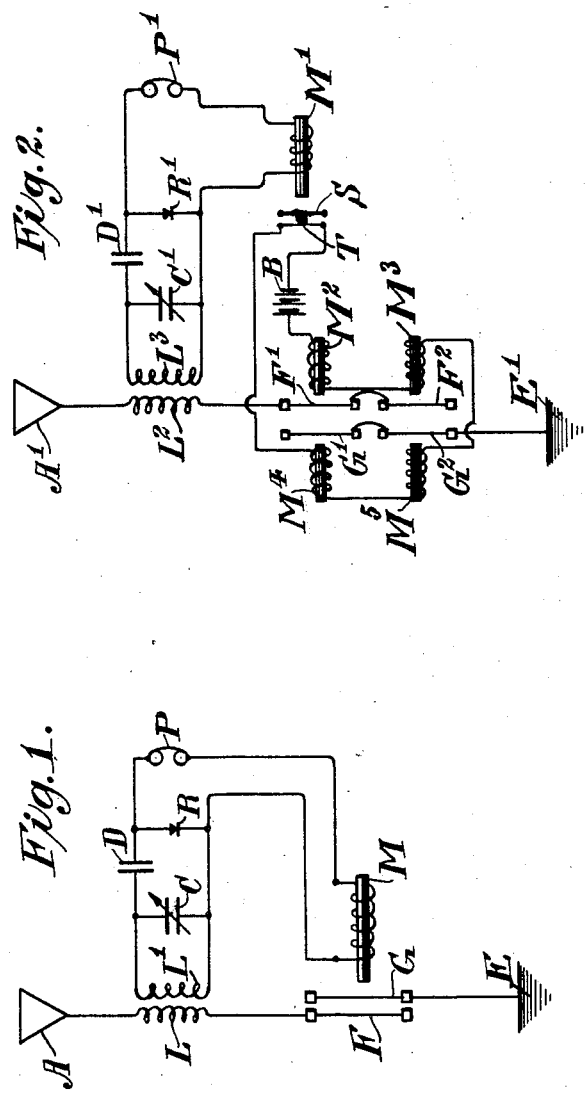
WITNESSES
INVENTOR
John Hays Hammond Jr.
BY
Mortimer Austin
ATTORNEYS

UNITED STATES PATENT OFFICE.

JOHN HAYS HAMMOND, JR., OF GLOUCESTER, MASSACHUSETTS.

AUTOMATIC TICKER-RECEIVER.

1,098,380.        Specification of Letters Patent.        Patented June 2, 1914.

Application filed August 24, 1912. Serial No. 716,863.

*To all whom it may concern:*

Be it known that I, JOHN HAYS HAMMOND, Jr., a citizen of the United States, residing at Gloucester, in the State of Massachusetts, have invented certain new and useful Improvements in Automatic Ticker-Receivers, of which the following is a specification.

My invention relates to improvements in receiving apparatus for radio telegraphy, and relates more particularly to automatic tickers which will operate in connection with tuned receiving circuits.

The object of my invention is to provide a ticker for an undamped electric wave receiver which will be entirely automatic in its action, and which will be an improvement on the mechanically and electrically operated interrupters and tickers heretofore used.

Referring to the accompanying drawings:—Figure 1, shows, in diagrammatic form, a radio-telegraph receiving station with my automatic ticker receiver. Fig. 2, shows, in diagrammatic form, a radio-telegraph receiving station with a modified form of my automatic ticker receiver.

In Fig. 1, A is an antenna, connected in series with an inductance coil L and an electromagnetically-actuated variable condenser F G, and grounded at E. The diaphragm G, forming one of the capacity areas of the condenser F G, is made of iron or other magnetic material. The antenna circuit, by means of the coils L and $L^1$, is coupled inductively with a closed oscillatory circuit comprising the inductance coil $L^1$ and the variable condenser C. This circuit supplies unidirectional current impulses to the telephone P and the electromagnet M, by the action of the stopping condenser D and the rectifier R.

The operation of the system is as follows:—A continuous undamped wave is received, with which the antenna circuit A L F G E and the closed oscillatory circuit $L^1$ C are in resonance. The electromagnet M is therefore energized and exerts an attractive force on the magnet diaphragm G of the condenser F G. When G moves away from the other capacity area F of this condenser, the capacity of the condenser is altered, and this change in capacity causes the antenna circuit to be thrown out of resonance with the incoming electric waves, and the antenna circuit receives so little energy, that the electromagnet M is practically deënergized and no longer exerts an attraction on diaphragm G. The latter therefore returns to its original position, the normal capacity of the condenser F G is restored, and the antenna circuit is again restored to resonance with the incoming electric waves. The receiving circuits are therefore actuated and the electromagnet M is again energized. As long as the undamped electric waves continue to arrive, the same cycle of operations is repeated, at a frequency determined by the vibration period of diaphragm G, and there will be produced in the receiving telephone P a sound corresponding to this vibration period of diaphragm G. As the undamped electric waves generally have a frequency above the limits of audibility, the telephone P will not respond audibly to the action of the electric waves alone.

In Fig. 2, an antenna $A^1$ is connected in series with an inductance coil $L^2$ and an electromagnetically-operated multiple variable condenser $F^1$ $G^1$ $F^2$ $G^2$, and is grounded at $E^1$. The antenna circuit, by means of the coils $L^2$ and $L^3$, is coupled inductively with a closed oscillatory circuit comprising the inductance coil $L^3$ and the variable condenser $C^1$. This circuit supplies unidirectional current impulses to the telephone $P^1$ and the electromagnet $M^1$, by the action of the stopping condenser $D^1$ and the rectifier $R^1$. Electromagnet $M^1$ actuates the diaphragm S of the resistance microphone T, which diaphragm is composed of iron or other magnetic material. Microphone T is in circuit with battery B and electromagnets $M^2$, $M^3$, $M^4$, and $M^5$. These electromagnets actuate, respectively, the diaphragms $F^1$, $F^2$, $G^1$ and $G^2$, which are composed of iron or other magnetic material, and which form the capacity areas of a multiple condenser, such as is described in my applications for U. S. Letters Patent, Serial No. 702,175, filed June 7, 1912, and Serial No. 703,219, filed June 12, 1912, where its advantages are set forth.

When the electromagnet $M^1$ is energized on the reception of undamped electric waves in resonance with the antenna and the closed oscillatory circuits, it exerts a force on diaphragm S. This alters the resistance of microphone T and so changes the strength of the current which flows from battery B through electromagnets $M^2$, $M^3$, $M^4$ and $M^5$, whose attractive force on diaphragm $F^1$, $F^2$, $G^1$ and $G^2$ is therefore altered, and the distance between corresponding diaphragms F¹ and G¹ and F² and G² increased or diminished. In consequence, the capacity of the condenser F¹ G¹ F² G² is changed, and the antenna circuit is thrown out of resonance with the incoming electric waves. The antenna circuit thereupon ceases to respond to the incoming waves and the closed oscillatory circuit L³ C¹ and the circuit containing electromagnet M¹ receive so little energy, that M¹ is demagnetized and ceases to attract diaphragm S, which returns to its normal position. The resistance of microphone T and the current through electromagnets M², M³, M⁴, and M⁵ therefore resume their normal condition, and the capacity of the condenser F¹ G¹ F² G² likewise becomes normal. The antenna circuit is therefore again restored to resonance with the incoming electric waves, the receiving circuits are again actuated and the electromagnet M¹ is again energized, and the cycle of operations is repeated, as long as the undamped electric waves continue to arrive, and sounds will therefore be produced in the receiving telephone P¹. By employing the multiple condenser microphone, the advantage is gained of securing a greater variation in the capacity of the antenna circuit, which can be thus thrown out of resonance more completely than with a condenser of the ordinary form.

I have not here shown transmitting apparatus, but any suitable radio transmitting apparatus, emitting undamped tuned electric waves, may be employed in connection with the receiving apparatus shown.

Instead of changing the oscillatory period of the antenna circuit, I may change the oscillatory period of the closed oscillatory circuit having a relatively small capacity so that the variations in the microphone-condenser will produce a relatively large variation in the total capacity of the circuit, and various other changes and modifications within the skill of those versed in the art, may be made in the particular apparatus shown and described herein, without departing from the spirit of my invention, provided the means set forth in the following claims be employed.

I claim as my invention:—

1. In a system of radio telegraphy, a tuned antenna circuit, including a variable condenser, a closed oscillatory circuit normally in resonance with said antenna circuit, a circuit including a telephone and an electromagnet which receives current impulses from said oscillatory circuit, said electromagnet being operatively connected with said variable condenser so as to vary the capacity of said condenser, substantially as described.

2. A radio telegraph receiving apparatus including a tuned oscillatory circuit, automatic means for changing the oscillation period of said circuit, and means for making audible the changes in said circuit.

3. In a radio telegraph receiving station, a tuned antenna circuit, means for automatically changing the capacity of said antenna circuit, means for automatically restoring said antenna circuit to its original condition, and means for making audible these changes in the antenna circuit.

4. A radio telegraph receiving apparatus including an antenna circuit, means for automatically varying the oscillation period of said antenna circuit at a rate within the limits of audibility, and means for making audible these changes in the oscillation period of said antenna.

5. In a radio telegraph receiving station, a tuned receiving circuit, means for automatically changing the oscillation period of said receiving circuit, and means for making audible the changes in said receiving circuit.

This specification signed and witnessed August, A. D., 1912.

JOHN HAYS HAMMOND, Jr.

Signed in the presence of—
MABEL J. COOPER,
S. A. THORNTON.